US007646483B2

(12) United States Patent
Estermann

(10) Patent No.: US 7,646,483 B2
(45) Date of Patent: Jan. 12, 2010

(54) LIGHT EMITTING MEANS WITH AN INTEGRATED MEASURING MODULE AND MEASURING COMPOSITION MODULE FOR LIGHT EMITTING MEANS

(76) Inventor: Simon-Boriz Estermann, Haupstrasse 2, Kofering (DE) 93096

( * ) Notice: Subject to any disclaimer, the term of this patent is extended or adjusted under 35 U.S.C. 154(b) by 260 days.

(21) Appl. No.: 11/655,276

(22) Filed: Jan. 19, 2007

(65) Prior Publication Data

US 2007/0170875 A1 Jul. 26, 2007

(30) Foreign Application Priority Data

Jan. 20, 2006 (DE) ....................... 10 2006 003 083

(51) Int. Cl.
*G01J 3/46* (2006.01)
*G05F 1/00* (2006.01)

(52) U.S. Cl. ........................ 356/402; 315/308; 315/291

(58) Field of Classification Search ................. 356/402; 315/308, 291
See application file for complete search history.

(56) References Cited

U.S. PATENT DOCUMENTS

| | | | | |
|---|---|---|---|---|
| 4,988,921 | A * | 1/1991 | Ratner et al. | 315/159 |
| 5,294,865 | A * | 3/1994 | Haraden | 315/58 |
| 5,811,942 | A * | 9/1998 | Pedretti | 315/312 |
| 5,850,126 | A * | 12/1998 | Kanbar | 315/200 A |
| 5,924,784 | A * | 7/1999 | Chliwnyj et al. | 362/234 |
| 6,046,549 | A * | 4/2000 | James | 315/291 |
| 6,127,789 | A * | 10/2000 | Ishizuka et al. | 315/308 |
| 7,520,634 | B2 * | 4/2009 | Ducharme et al. | 362/276 |
| 2004/0232849 | A1 | 11/2004 | Roach, Jr. | |

* cited by examiner

*Primary Examiner*—Roy Punnoose
(74) *Attorney, Agent, or Firm*—Hoffman, Wasson & Gitler

(57) ABSTRACT

A light emitting device with an integrated measuring module for determining at least one measured value for calculating the power consumption of the lamp, the luminosity emitted by the lamp and/or the operating time of the lamp. The measuring module is integrated in the lamp and is used in the light emitting device considerably simplifies the measuring of the energy operating characteristics of the lamp.

9 Claims, 4 Drawing Sheets

LIGHT EMITTING MEANS WITH AN INTEGRATED MEASURING MODULE AND MEASURING COMPOSITION MODULE FOR LIGHT EMITTING MEANS

BACKGROUND OF THE INVENTION

The invention relates to a light emitting means with at least one connecting unit and at least one luminous element, in particular a fluorescent lamp, an incandescent lamp, a halogen lamp and/or a light emitting diode for use in lighting devices, and a measuring composition module for light emitting means with at least one connecting unit and at least one luminous element.

Lighting devices with lamps of a wide variety of lighting technologies used therein are sufficiently known in the art. Such lighting devices feature at least one housing or lamp shade with a lamp connection, for example a conventional screw socket or at least one plug-in connection, by means of which at least one lamp, for example a light bulb, fluorescent tube or special lamp is inserted into the respective lighting device, and through which it is supplied with the electric power required for operation of the lamp.

The disadvantage is that the operating characteristics of the lamps operated in such lighting devices can be determined only by means of additional measuring devices provided for purposes of measuring. Determining the average electric power consumption of a lamp or its emitted luminosity, in particular for each lamp, or the time of day and week, is currently possible only through highly complex technical processes.

It is an object of the present invention is to present light emitting means and a measuring composition module that enables a simple and practicable determination of the energy operating characteristics of at least one lamp in a lighting device.

SUMMARY OF THE INVENTION

It is an essential aspect of the light emitting device according to the invention is that the light emitting device has an integrated measuring module for determining at least one measured value for calculating the power consumption of the lamp, the luminosity emitted by the lamp and/or the operating time of the lamp. One advantage of the invention is that the integration of the measuring module in the lamp to be used in the light emitting device considerably simplifies the measuring of the energy operating characteristics of the at least one lamp.

In an alternative embodiment of the invention, the measuring module is integrated in measuring composition module, which encloses at least partially the luminous element of the lamp, and in which the measuring module is again provided for determining at least one measured value for calculating the power consumption of the lamp, the luminosity emitted by the lamp and/or the operating time of the lamp. Said "add-on measuring module" enables retrofitting of already installed lamps with a measuring unit for determining the energy operating characteristics of the at least one lamp.

BRIEF DESCRIPTION OF THE DRAWINGS

The invention is described in the following based on several exemplary embodiments with reference to the drawings, wherein.

DETAILED DESCRIPTION OF THE INVENTION

Figure 1:
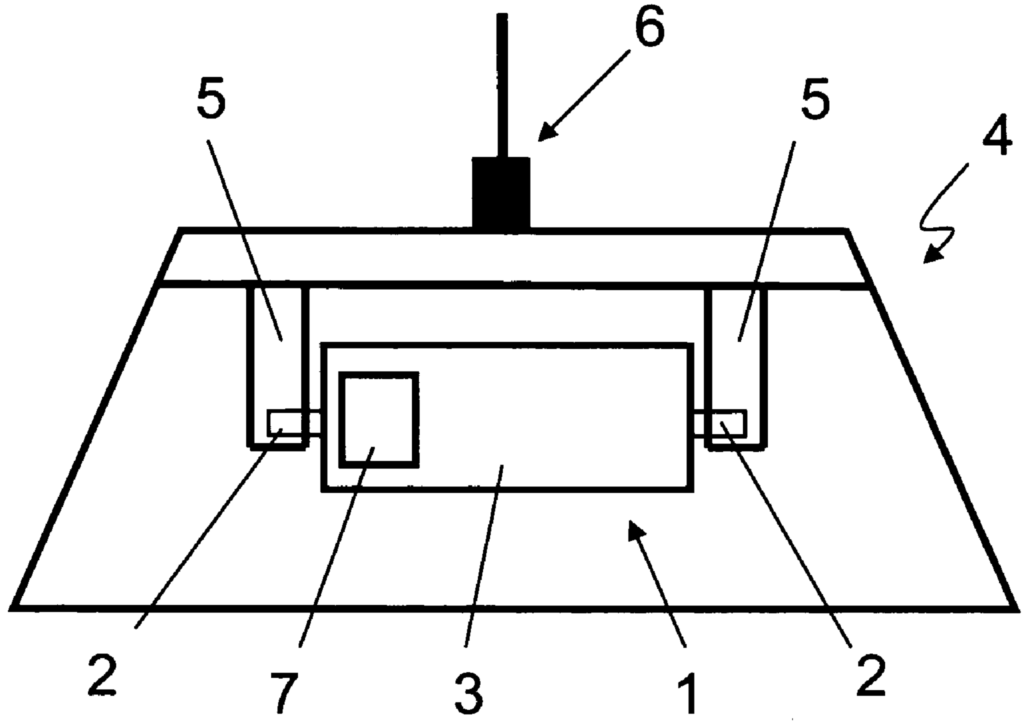
FIG. 1 shows a lighting device with a lamp according to the invention.
Figure 2:
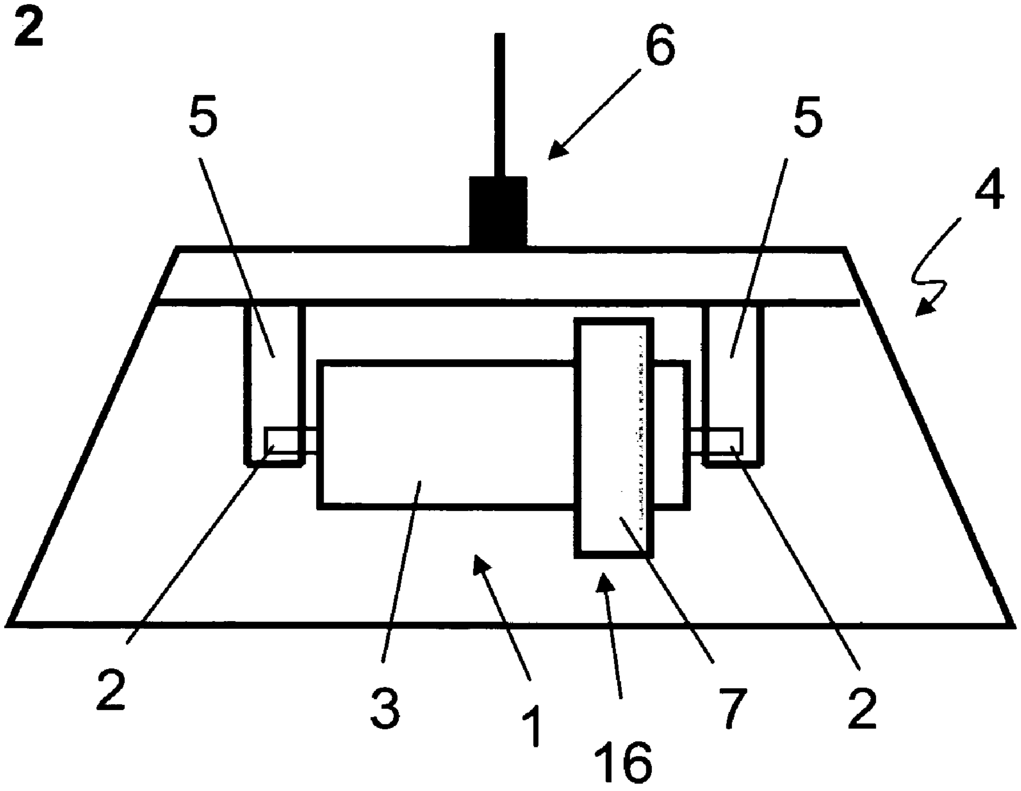
FIG. 2 shows a lighting device with a conventional lamp and an add-on measuring module according to the invention.

In the drawings, 1 designates a light emitting means resp. a lamp, which features at least one connecting unit 2 and at least one luminous element 3. The connecting unit 2 can be designed for example as a threaded connecting unit or as a plug-in connecting unit of the standard type for various types of lamps, such as Edison threads or a plug strip comprising two contact pins.

The luminous element 3 is designed for example as a fluorescent tube, a conventional light bulb or a light-emitting diode, etc. Such lamps 1 are used and operated in lighting devices 4, which comprise at least one lamp connection 2 and one power supply connection 6. The lighting devices 4 can have a wide variety of designs and technical characteristics. In particular, they can be suitable for indoor or outdoor use, and depending on the area of application they can differ in external appearance. Such lighting devices 4 can also accommodate a plurality of lamps, which can be operated simultaneously or alternately.

In the exemplary embodiment depicted in FIG. 1, the lamp features an integrated measuring module 7 for determining at least one measured value for calculating the power consumption of the lamp 1, the luminosity emitted by the lamp 1 and/or the operating time of the lamp 1. The integrated measuring module 7 can be provided for example in one of the connecting units 2 of the lamp 1 or it can be integrated in an add-on housing module 8 provided between the connecting unit 2 and the luminous element 3.

In a preferred embodiment, the integrated measuring module 7 is connected via the connecting unit 2 to the power supply of the lighting device 4. For this purpose, the integrated measuring module 7 is connected at least with the voltage-carrying connecting elements of the connecting unit 2 by means of connecting lines 9.

In an alternative embodiment the lamp 1 features a converter unit 10 for converting the AC supply voltage to DC voltage; said converter unit 10 can be located either in the connecting unit 2 or in the integrated measuring module 7. The converter unit 10 is to be provided in particular if the lamp 1 comprises luminous elements 3 that require rectified voltage, for example a light-emitting diode or a halogen lamp.

Figure 3:
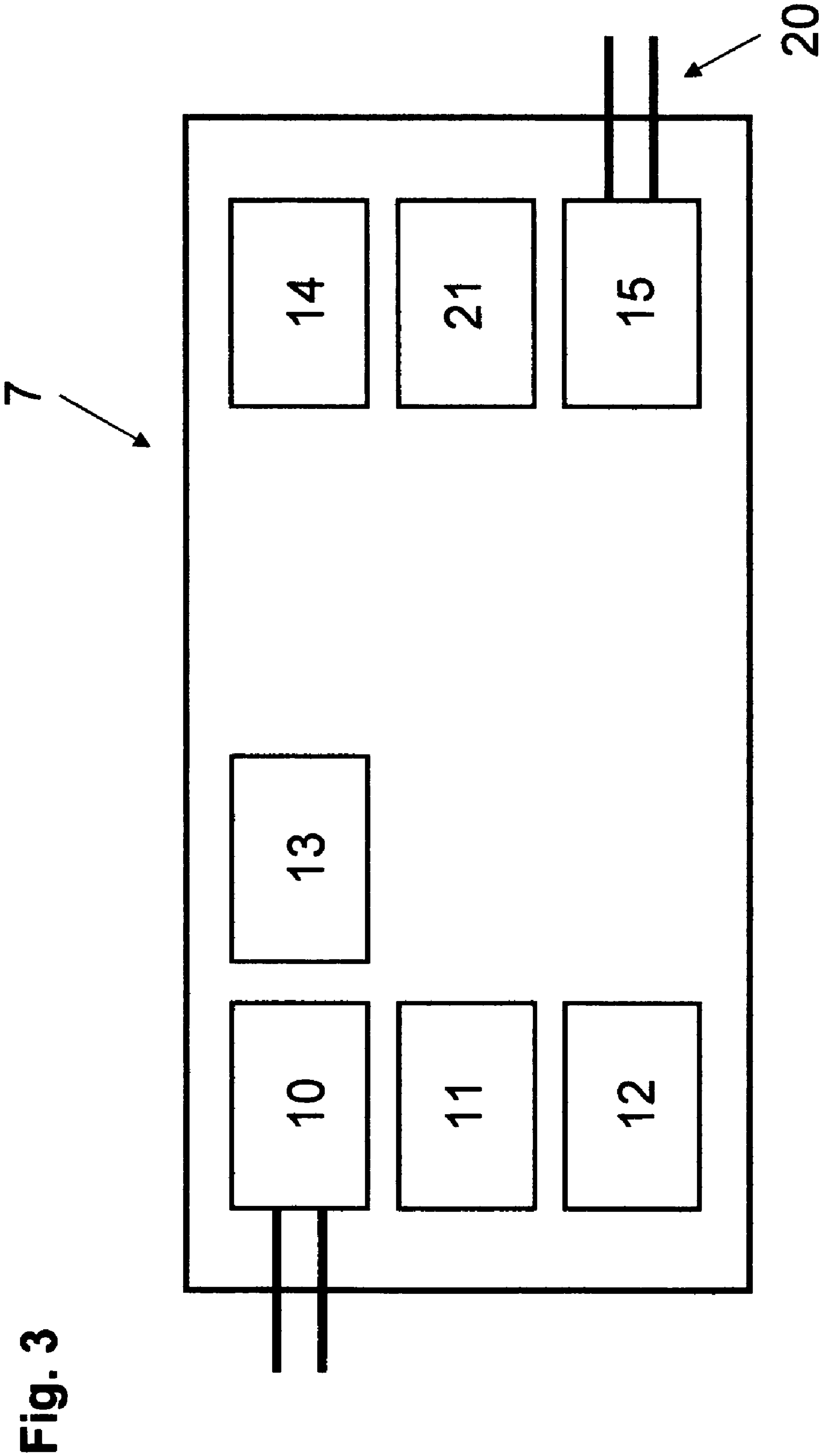
FIG. 3 shows a schematic depiction of the structure of an integrated measuring module.
Figure 4:
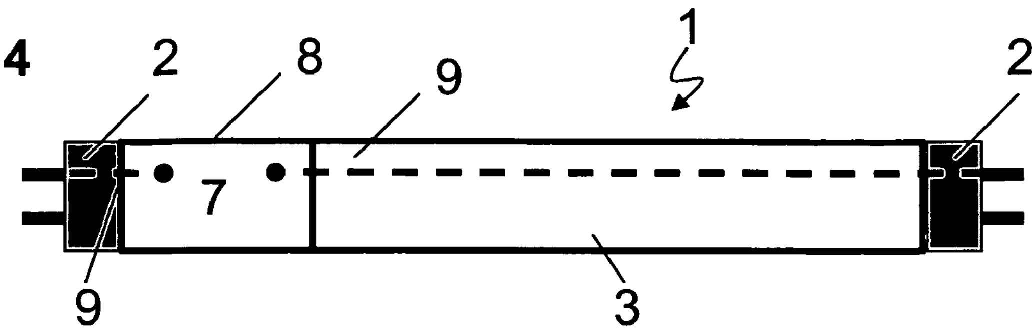
FIG. 4 shows a lamp designed as a fluorescent tube with a measuring module integrated in an add-on housing module.
Figure 5:
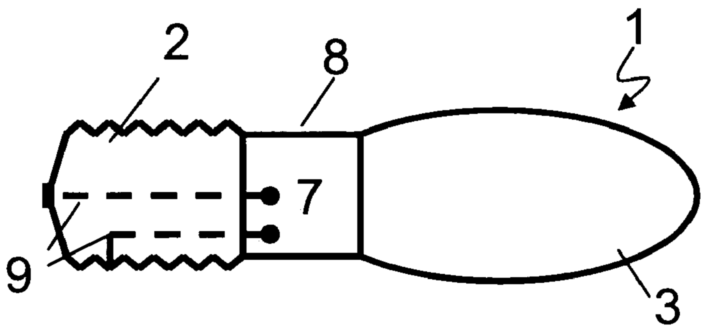
FIG. 5 shows a lamp designed as a light bulb with an add-on housing module with integrated measuring module between the Edison thread and the light bulb.
Figure 6:
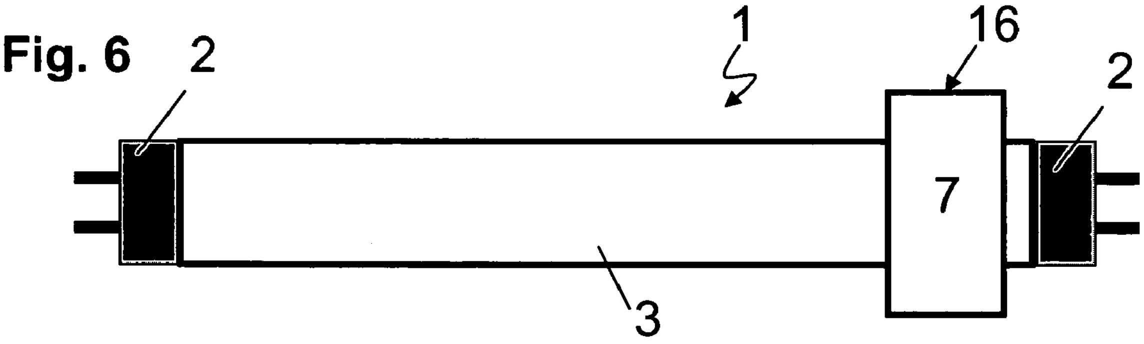
FIG. 6 shows a lamp designed as a fluorescent tube with an attached add-on measuring module.
Figure 7:
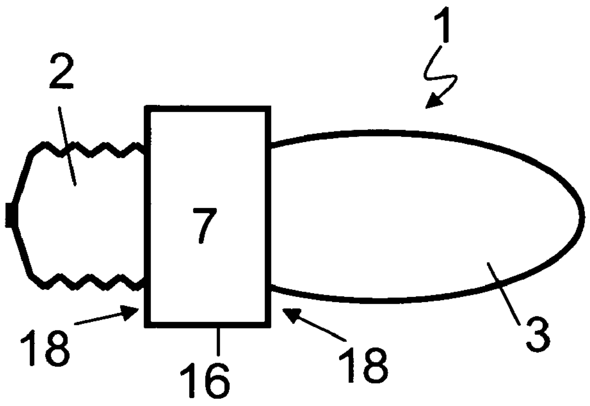
FIG. 7 shows a lamp designed as a light bulb with an add-on measuring module between the Edison thread and the light bulb.
Figure 8A:
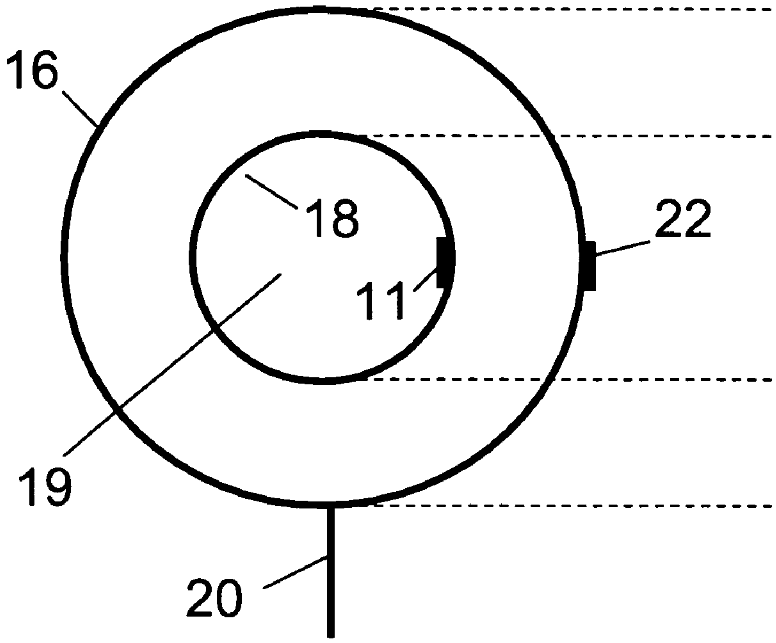
FIG. 8*a,b* show, in top and side view, a ring-shaped measuring composition module.
Figure 8B:
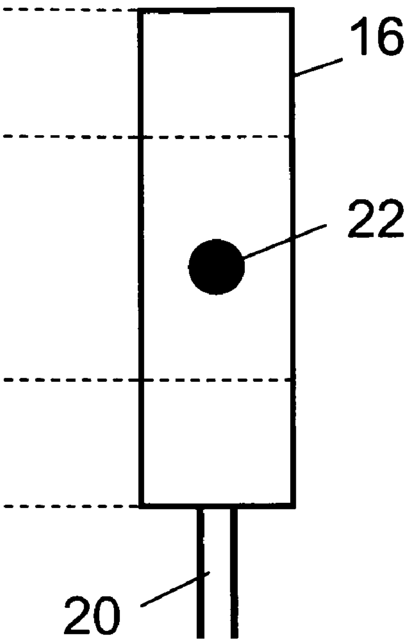
Figure 9:
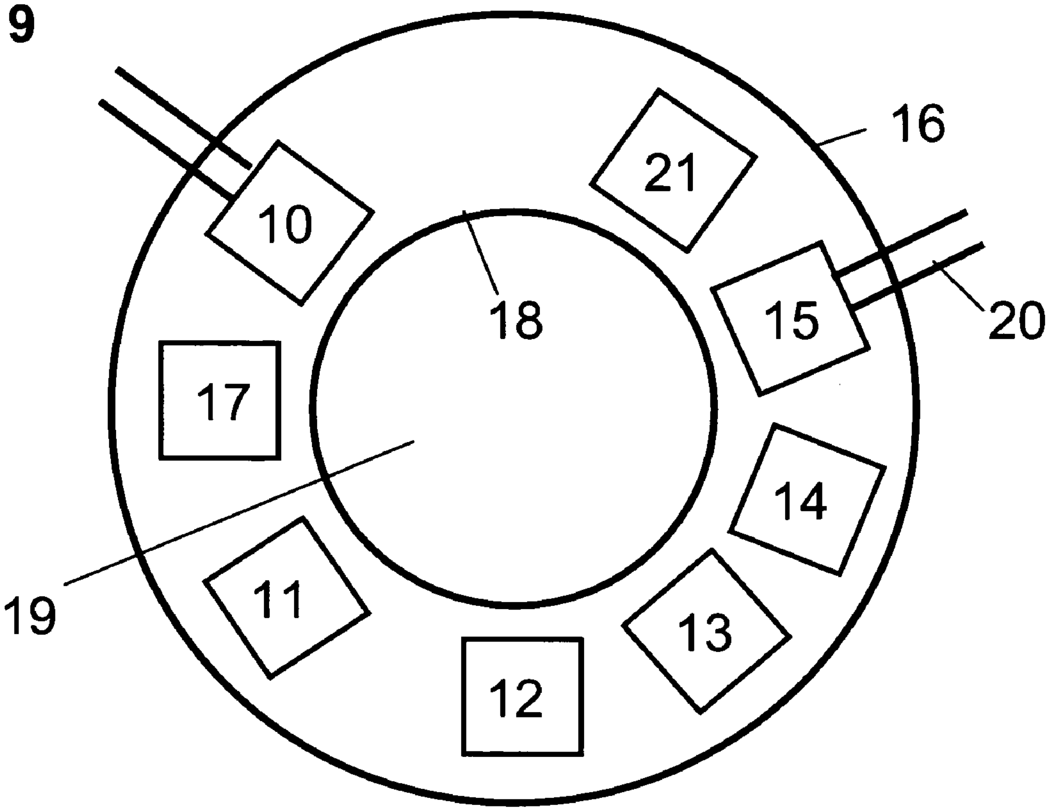
FIG. 9 shows a schematic depiction of the structure of a ring-shaped measuring composition module.

The measuring module 7 depicted in FIG. 3 comprises a measuring unit 11 for measuring the values for calculating the power consumption of the lamp 1, the luminosity emitted by the lamp 1 and/or the operating time of the lamp 1, a storage unit 12 for storing the measured values, an analysis unit 13 for calculating the power consumption of the lamp 1, the luminosity emitted by the lamp 1 and/or the operating time of the lamp 1 from the measured values.

Furthermore, a transmitting unit 14 can be provided in the measuring module 7 for radio transmission of the measured values and/or the determined power consumption and/or the determined luminosity and/or the determined operating time of the lamp 1 to an external receiving unit (not depicted in the drawings) the location of which is spatially distant from the lamp and by means of which encoded values for example can be transmitted to a remote or centrally located analysis unit.

Values that can be measured by means of the measuring unit 11 include amperage, luminosity, brightness and/or time of day and week and can be measured individually and/or simultaneously.

The measuring unit 11 can be for example an ammeter, a brightness sensor and/or a time measuring unit. Furthermore, switching means 15 can be provided in the measuring module 7 for switching the luminous element 3 of the lamp 1 on and off based on the values measured or threshold values stored in the storage unit 12.

In addition, the storage unit 12 can be read via remote reading units (not depicted in the drawings) by means of electrical signals transmitted by the transmitting unit 14. In a preferred embodiment, the storage unit 12 can be designed as an interchangeable storage medium, which can be inserted in a slot (not depicted) of an add-on housing module 8.

In an alternative embodiment of the invention the measuring module 7 can be integrated in an add-on measuring module 16, which encloses at least partially the luminous element 3 of the lamp 1, and in which the measuring module 7 integrated in the add-on measuring module 16 is provided for determining at least one measured value for calculating the power consumption of the lamp 1, the luminosity emitted by the lamp 1 and/or the operating time of the lamp 1.

For the supply of power, the add-on measuring module 16 has for example its own power supply 22, for example a photovoltaic unit or a battery unit or a rechargeable battery unit.

Furthermore, the measuring module 16 is provided at least on the surface sections 18 forming the contact surfaces to the lamp with a heat-resistant coating, in particular a heat-resistant plastic layer or plastic ring, in order to prevent damage to the add-on measuring module 16 in the event of heat build-up in the luminous element 3 or the connecting unit 2.

In a preferred embodiment, the add-on measuring module 16 features an opening or recess 19 for at least partial accommodation of the luminous element 3 of the lamp 1. The add-on measuring module can be designed in a particular as a circular ring module, which concentrically encloses the luminous element 3, which is designed for example as a fluorescent tube, or is located between the connecting unit 2 designed as an Edison socket and the luminous element 3 designed as a light bulb.

Furthermore, the measuring module 7, with a design analogous to the integrated embodiment of the measuring module, comprises for example a measuring unit 11, a storage unit 12, an analysis unit 13, a transmitting unit 14 and switching means 15 with analogous functions.

When the lamp 1 is designed as a fluorescent tube, for example, the add-on measuring module 16 can be connected to the power supply of the lighting device 4 by means of a converter unit 10. The luminous element 3 or the fluorescent tube can be switched on and off by means of the switching means 15, for example by means of relay switches 20, based on the measured values.

The converter unit 10 converts AC voltage for example from 230 V AC to a variable DC voltage between 3 V and 12 V DC. For this purpose, the converter unit is equipped for example with a conventional diode rectifier circuit and internal smoothing devices, in addition to a transformer circuit.

In addition, a receiver unit 21 can be provided in the respective embodiment of the measuring module 7 for transmission of control commands, for example from a central control unit to the measuring module and for example for switching the lamp 1 on and off.

The described lamp with integrated measuring module 7 or the add-on measuring module 16 with integrated measuring module 7 is provided in particular for the exact calculation of the electric power used by the respective lamp 1, which can be determined by various means using different measured values.

Therefore, this enables an exact accounting basis for example between an operator of streetlight systems, traffic systems, advertising systems or contracting systems and the respective power supply company, in order to allow the exact individual calculation of the power consumption based on the exact duration of use of the respective lamp. In a preferred embodiment the add-on measuring module 16 is manufactured from an insulating material, in particular plastic.

The switching means 15 provided enable, for example, dimming of individual lamps 1 in a lighting device 4 comprising a plurality of lamps 1, in order to save energy, based on the determined luminosity or brightness and the time of day. Switching can be monitored via the status parameters for the respective lamp 1 transmitted by the transmitting unit 4.

A receiving unit 21 can additionally be provided in the integrated measuring module 7. The transmitting unit 14 and receiving unit 21 are designed for the transmission of electric, electromagnetic waves, in particular in accordance with capacitive or inductive transmission processes.

The invention was described above based on exemplary embodiments. It goes without saying that numerous modifications and variations are possible without abandoning the underlying inventive idea on which the invention is based.

REFERENCE LIST

1 light emitting means resp. lamp
2 connecting unit
3 luminous element
4 lighting device
5 lamp connection
6 power supply connection
7 integrated measuring module
8 add-on housing module
9 connecting line
10 converter unit
11 measuring unit
12 storage unit
13 analysis unit
14 transmitting unit
15 switching means
16 measuring composition module resp. add-on measuring module
17 power supply unit
18 surface sections
19 opening or recess
20 switching output
21 receiving unit
22 separate power supply

What is claimed is:

1. A light emitting means comprising of at least one connecting unit and at least one luminous element, said luminous element is a fluorescent lamp, an incandescent lamp, a halogen lamp or a light-emitting diode for use in lighting devices with at least one lamp connection, wherein the light emitting means comprises an integrated measuring module for determining at least one measured value for calculating a power consumption of the lamp, a luminosity emitted by the lamp or on the operating time of the lamp;

wherein the integrated measuring module is located in the at least one connecting unit of the lamp or in an add-on housing module between the at least one connecting unit and the luminous element;

wherein the at least one connecting unit is a threaded connecting unit or a plug in connecting unit;

wherein the integrated measuring module further comprises a measuring unit for measuring the at least one measured value; and wherein the integrated measuring module further comprises an analysis unit for calculating the power consumption of the lamp, the luminosity emitted by the lamp or the operating time of the lamp from the at least one measured value.

2. The light emitting means according to claim 1, wherein the integrated measuring module is connected via the connecting unit to a power supply of the lighting device.

3. The light emitting means according to claim 1, wherein the lamp further comprises a converter unit for converting AC supply voltage to DC voltage.

4. The light emitting means according to claim 3, wherein the integrated measuring module is connected to the converter unit.

5. The light emitting means according to claim 1, wherein the integrated measuring module further comprises a storage unit for storing the at least one measured values.

6. The light emitting means according to claim 1, wherein the integrated measuring module further comprises a transmitting unit for radio transmission of the at least one measured values or the determined power consumption or the determined luminosity or the determined operating time of the lamp to a receiving unit that is spatially distant from the lamp.

7. The light emitting means according to claim 1, wherein the at least one measured values are the amperage, luminosity, brightness and/or the time of day or week.

8. The light emitting means according to claim 1, wherein the integrated measuring module is an ammeter, a brightness sensor or a time measuring unit.

9. The light emitting means according to claim 1, wherein the integrated measuring module further comprises switching means for switching the connected luminous element on and off based on the at least one measured value.

* * * * *